Dec. 17, 1946.  W. A. BRECHT ET AL  2,412,866
DOUBLE-END TURBINE LOCOMOTIVE
Filed Feb. 10, 1944
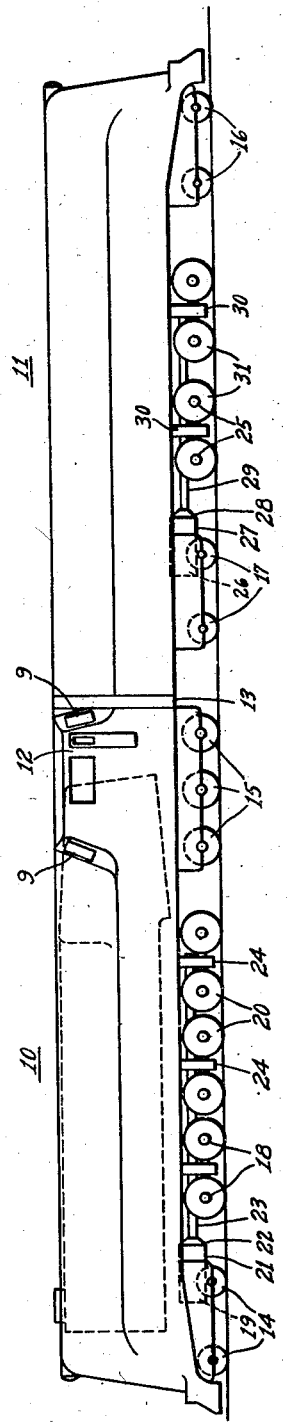
WITNESSES:
C. J. Weller.
N. B. Olucott
INVENTORS
Winston A. Brecht
and Charles Kerr, Jr.
BY
G. M. Crawford
ATTORNEY Patented Dec. 17, 1946

2,412,866

UNITED STATES PATENT OFFICE 2,412,866

DOUBLE-END TURBINE LOCOMOTIVE

Winston A. Brecht, Wilkinsburg, and Charles Kerr, Jr., Edgewood, Pa., assignors to Westinghouse Electric Corporation, East Pittsburgh, Pa., a corporation of Pennsylvania Application February 10, 1944, Serial No. 521,792

5 Claims. (Cl. 105—38)

Our invention relates, generally, to locomotives and, more particularly, to turbine-driven locomotives.

An object of our invention, generally stated, is to provide a locomotive which shall be simple and efficient in operation and which may be economically manufactured and installed.

A more specific object of our invention is to provide a locomotive capable of operating at relatively high speeds in either direction.

Another object of our invention is to provide a locomotive having relatively high horsepower capacity and relatively light axle loadings.

A further object of our invention is to provide a locomotive and tender of a substantially symmetrical outline.

Other objects of our invention will be explained fully hereinafter or will be apparent to those skilled in the art.

In accordance with one embodiment of our invention, a locomotive is comprised of two units, a power unit and a tender unit which have a substantially symmetrical outline. An operating cab is located on the power unit near the middle of the locomotive, but the design of both units is such as to provide clear vision in each direction from the operating cab. Driving wheels may be provided on both the power and the tender units and propelled by turbines, preferably of the steam type.

For a fuller understanding of the nature and objects of our invention, reference may be had to the following detailed description, taken in conjunction with the accompanying drawing, in which the single figure is a diagrammatic view of a locomotive embodying our invention.

Referring to the drawing, the locomotive shown therein is composed of a power unit 10 and a tender unit 11 which have a substantially symmetrical outline and are disposed back-to-back. An operating cab 12 is disposed at the rear of the power unit 10, substantially at the middle of the locomotive. The design of both units is such as to provide clear vision in each direction through windows 9 provided in the cab 12.

As shown, the locomotive is of the rigid frame type. However, a locomotive of the truck type may be utilized if desired. The power unit 10 and the tender unit 11 are coupled together at 13 between the two units. Guiding trucks 14 and 15 are provided at the front and the rear ends, respectively, of the power unit 10. Likewise, guiding trucks 16 and 17 may be provided at the front and the rear ends, respectively, of the tender unit 11. Therefore, the locomotive will operate satisfactorily at relatively high speeds in either direction. If desired, the tender unit 11 may be of the truck type instead of the rigid frame type.

As illustrated, the power unit 10 may be provided with six driving axles 18 which are propelled by a turbine 19. Since each axle has two wheels, the power unit is provided with twelve driving wheels 20. The turbine 19 may be connected to the axles 18 through a reduction gearing 21, a reverse gear 22, a longitudinally disposed drive shaft 23 and additional reduction gear units 24 disposed between the shaft 23 and the axles, as more fully described in our copending application Serial No. 521,793, filed February 10, 1944.

It will be understood that driving arrangements of other types may be utilized if desired. Thus, the driving wheels may be propelled by a separate turbine, geared to each axle, or by a turbine geared to each of two axles. Furthermore, the number of driving axles may be varied. Also, a reverse turbine, or turbines, may be utilized in place of reversing gears.

In order to increase the total adhesive weight on the driving wheels, particularly for freight service, driving axles 25 may be provided for the tender unit 11. The axles 25 may be propelled by a turbine 26 which may be connected to the axles 25 through a reduction gearing 27, a reverse gear 28, a drive shaft 29 and reduction gear units 30. As shown, the tender unit is provided with eight driving wheels 31, however, as explained hereinbefore, driving arrangements of other types may be utilized for the tender unit as well as for the power unit.

From the foregoing description, it is apparent that we have provided a double-end locomotive which has numerous advantages over prior structures. The use of a turbine drive permits small driving wheels to be utilized, thereby making it possible to provide as many as six driving axles in a rigid wheel base and permitting rigid steam connections to the turbine or turbines.

The provision of at least six axles in a rigid frame makes possible a locomotive having a horsepower capacity considerably greater than conventional locomotives of the same wheel base. This also permits relatively light axle loadings, as compared with previous loadings.

The use of small wheels permits the installation of a larger diameter boiler within permissible height restrictions. The provision of a running gear for the tender unit similar to that of the locomotive permits its operation in either direction at high speed with excellent tracking characteristics.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. A double-end locomotive comprising, a power unit and a tender unit having a substantially symmetrical outline, an operating cab disposed substantially at the middle of the locomotive to afford clear vision in either direction, said power unit having a guiding truck disposed at each end thereof and a plurality of driving axles disposed between the guiding trucks, said tender unit having a guiding truck at each end thereof and a plurality of driving axles between the guiding trucks, and turbine means disposed between wheels of the guiding trucks for propelling said driving axles at relatively high speeds in either direction, said turbine means being directly connected to said axles through reversing and reduction gears and drive shafts disposed longitudinally of the locomotive.

2. A double-end locomotive comprising, a power unit and a tender unit having a substantially symmetrical outline, an operating cab disposed substantially at the middle of the locomotive to afford clear vision in either direction, said power unit having a guiding truck disposed at each end thereof and a plurality of driving axles disposed between the guiding trucks, said tender unit having a guiding truck at each end thereof and a plurality of driving axles between the guiding trucks, turbine means disposed between wheels of one of its guiding trucks for propelling the driving axles on the power unit, and additional turbine means disposed between wheels of one of its guiding trucks for propelling the driving axles on the tender unit, said turbine means being directly connected to said axles through reversing and reduction gears and drive shafts disposed longitudinally of the locomotive, whereby said locomotive is capable of operating at relatively high speeds in either direction.

3. A double-end locomotive comprising, a power unit and a tender unit having a substantially symmetrical outline and disposed in back-to-back relation, an operating cab disposed at the rear of the power unit and substantially at the middle of the locomotive, said power unit having a guiding truck disposed at each end thereof and driving axles disposed between the guiding trucks, said tender unit having a guiding truck at each end thereof and driving axles between the guiding trucks, and turbine means disposed between wheels of the guiding trucks for propelling said driving axles at relatively high speeds in either direction, said turbine means being directly connected to said axles through reversing and reduction gears and drive shafts disposed longitudinally of the locomotive.

4. A double-end locomotive comprising, a power unit and a tender unit having a substantially symmetrical outline and disposed in back-to-back relation, an operating cab disposed at the rear of the power unit and substantially at the middle of the locomotive, said power unit having a guiding truck disposed at each end thereof and driving axles disposed between the guiding trucks, said tender unit having a guiding truck at each end thereof and driving axles between the guiding trucks, turbine means disposed between wheels of one of the guiding trucks on the power unit for propelling the driving axles on the power unit, and turbine means disposed between wheels of one of the guiding trucks on the tender unit for propelling the driving axles on the tender unit, said turbine means being directly connected to said axles through reversing and reduction gears and drive shafts disposed longitudinally of the locomotive, whereby said locomotive is capable of operating at relatively high speeds in either direction.

5. A two-unit locomotive having two frame sections coupled together, a power unit having a boiler disposed on one frame section, a tender unit disposed on the other frame section, an operating cab disposed in the power unit and substantially at the middle of the locomotive, a guiding truck disposed at each end of the power unit, a plurality of driving axles disposed between said guiding trucks, a guiding truck disposed at each end of the tender unit, a plurality of driving axles disposed between said guiding trucks, turbine means disposed underneath the boiler and between wheels on one of the guiding trucks on the power unit for propelling the driving axles on the power unit, and turbine means disposed between wheels of one of the guiding trucks on the tender unit for propelling the driving axles on the tender unit, said turbine means being directly connected to said axles through reversing and reduction gears and drive shafts disposed longitudinally of the locomotive, whereby said locomotive is capable of operating at relatively high speeds in either direction.

WINSTON A. BRECHT.
CHARLES KERR, Jr.